United States Patent [19]

Clokie

[11] Patent Number: 5,128,551
[45] Date of Patent: Jul. 7, 1992

[54] ELECTRICAL SUPPLY CONTROL SYSTEMS FOR A MOTOR VEHICLE

[75] Inventor: Andrew K. Clokie, Keresley Village, United Kingdom

[73] Assignee: Jaguar Cars Limited, United Kingdom

[21] Appl. No.: 557,313

[22] Filed: Jul. 23, 1990

[30] Foreign Application Priority Data

Jul. 25, 1989 [GB] United Kingdom ............... 8916997

[51] Int. Cl.$^5$ ................................................ B60L 1/00
[52] U.S. Cl. .................................. 307/10.1; 307/10.3; 320/13
[58] Field of Search .................... 307/10.1, 10.2, 10.3; 290/37 R; 200/43.08, 61.66; 320/13

[56] References Cited

U.S. PATENT DOCUMENTS

| | | | |
|---|---|---|---|
| 2,802,198 | 8/1957 | Poludniak | 340/64 |
| 4,063,610 | 12/1977 | Shilling | 180/114 |

FOREIGN PATENT DOCUMENTS

| | | |
|---|---|---|
| 0235551 | 1/1987 | European Pat. Off. |
| 0362843 | 10/1989 | European Pat. Off. |
| 2474753 | 1/1980 | France |
| 542327 | 1/1942 | United Kingdom |
| 543486 | 2/1942 | United Kingdom |
| 1586004 | 3/1981 | United Kingdom |

*Primary Examiner*—A. D. Pellinen
*Assistant Examiner*—Aditya Krishnan
*Attorney, Agent, or Firm*—Davis, Bujold & Streck

[57] ABSTRACT

An electrical supply control system from a battery to the electrical facilities of a motor vehicle is arranged to isolate the battery from the electrical facilities in some circumstances to reduce the risk of inadvertent drain on the battery. The system comprises a main switch arranged to supply power from the battery, to the electrical facilities. A coil is arranged when energised to close the main switch and is connected to be energised when an engine function element such as an ignition switch is active. The coil can be disconnected from the engine function element by a connector. A manually operable mechanical actuator for the main switch is arranged in one position to close the main switch to provide a continuous supply to the electrical facilities and in another position to allow the state of energisation of the coil to control opening and closing of the main switch and thus isolate the loads when the engine function element is inactive. With battery, switch and the connector in an inaccessible locked compartment, the connector disconnected and the main switch open mechanically, security is provided against unauthorised use of the vehicle.

6 Claims, 2 Drawing Sheets

ELECTRICAL SUPPLY CONTROL SYSTEMS FOR A MOTOR VEHICLE

BACKGROUND TO THE INVENTION

The invention relates to electrical supply control systems for motor vehicles and is concerned particularly with safeguarding an electrical storage battery in a motor vehicle from excessive discharge.

There is an increasing tendency to equip motor vehicles with electrically operated facilities which take power from the vehicle battery with the vehicle unattended. Typical examples are memories for preferred positions of electrically adjustable devices such as seats and mirrors and memories for radio tuning. Another example is the vehicle clock. In addition to these facilities which can not normally be isolated from the electrical supply under the control of a driver, other electrical facilities may be left on accidentally when a vehicle is unattended or may fail to a condition where they draw current inadvertently. All these factors tend to cause the battery to run down when the vehicle is left for a long period.

The problem of inadvertent battery discharge is particularly significant with a new vehicle which may remain unused for a few weeks or even months during transit from manufacturing facility to dealership or in storage awaiting a customer. Allowing the battery to discharge in these conditions not only results in the embarrassment of a flat battery but can do permanent damage to the battery.

Disconnection of the vehicle battery during storage can be an effective contribution to solving this problem. However, electrical power may be required within the vehicle at short notice, for example to start the engine for vehicle manoeuvring during transit or when rearranging vehicles in storage. For this reason simple disconnection of battery terminals is impractical. It has also been proposed to provide a relay in the battery circuit of the vehicle and to connect it into the vehicle electrical system in such a way that power is normally isolated from ignition and other load circuits when the normal ignition switch is off but the relay is energised on switching on the ignition to provide power to both the ignition and the other loads. This relay is discarded prior to delivery of the vehicle to a customer so that those facilities such as memories referred to above which are required continuously are provided with power even when the ignition is off. Provision of a relay for such temporary use and the requirement for its removal render this arrangement relatively uneconomic.

It has also been proposed to provide a motor vehicle with an isolation switch which disconnects the battery from the electrical facilities of the car. Such a switch provides a security function if the switch is not readily accessible. It also can be used to guard against inadvertent battery discharge when the vehicle is left unattended for several days. It can also be useful during vehicle servicing when there is often a requirement to disconnect the battery. Switches for this purpose have to be particularly heavy duty because they pass large currents and have to remain reliable for a long period of time. For example, a switch could remain closed for some years and then need to operate perfectly the first time that it is opened and reclosed.

An object of the invention is to provide an electrical supply control system for a motor vehicle in which a wide range of control possibilities are available with a single switch.

SUMMARY OF THE INVENTION

In accordance with the present invention there is provided an electrical supply control system from a battery to the electrical facilities of a motor vehicle comprising a main switch arranged to supply power from the battery to substantially all of the electrical facilities of the vehicle, a coil arranged when energised to close the main switch and connectable to be energised when an engine function element is active, means for disconnecting the coil from the engine function element; and a manually operable mechanical actuator for the main switch arranged in one position to close the main switch and in another position to allow the state of energisation of the coil to control opening and closing of the main switch.

Typically the engine function element is a key operated ignition switch but in a diesel engined vehicle it would be the key operated engine control switch which replaces the conventional ignition switch.

In use, the coil is connected to the engine function element when the vehicle is new and the mechanical actuator for the switch is in its open condition which permits open/close control of the main switch by energisation of the coil. Thus with the ignition off or other engine function element inactive, the main switch is open. When the engine function element is activated, the coil is energised and the main switch is closed. In this way all vehicle functions are available with the engine function element active but are isolated with the engine function element inactive.

During a pre-delivery check prior to providing the car to a customer, the coil is disconnected from the engine function element leaving an entirely open circuit. The coil is never used again during normal operation of the vehicle. Thereafter, the main switch is closed and held closed by the mechanical actuator but for security purposes or servicing it on occasion may be opened by the mechanical actuator.

The main switch should be in a secure part of a vehicle so that when the switch is left open it can not be accessed and switched to the closed state by an unauthorised person. Typically, the vehicle battery and the main switch are housed within the boot (that is the trunk) of the car.

BRIEF DESCRIPTION OF THE DRAWINGS

An embodiment of the invention will now be described by way of example only with reference to the accompanying drawings in which.

DESCRIPTION OF A PREFERRED EMBODIMENT

Figure 1:
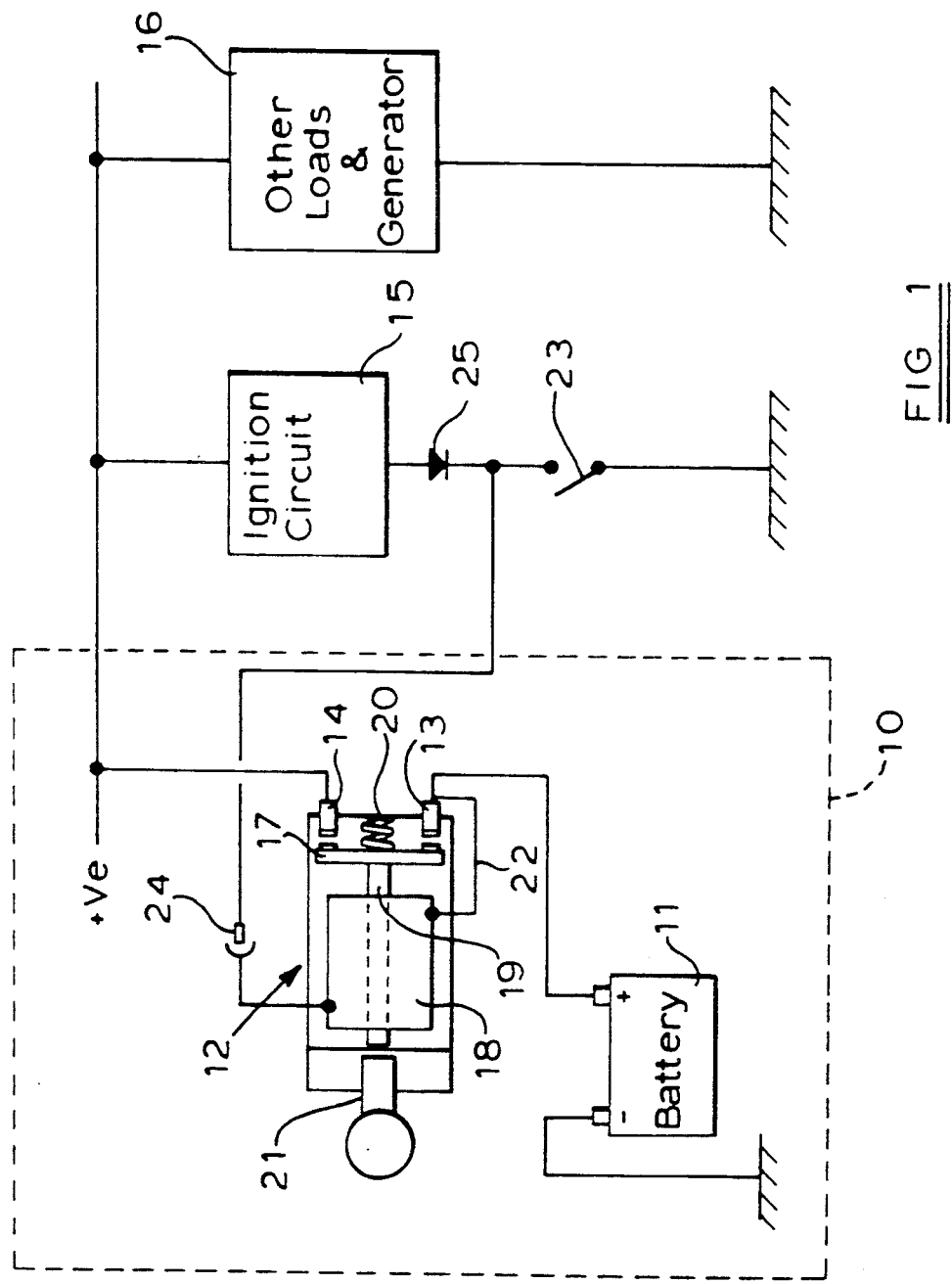
FIG. 1 is a circuit diagram showing the electrical supply control system of the invention.

In the vehicle electrical circuit of FIG. 1, a vehicle battery 11 has its negative terminal $-Ve$ grounded to the vehicle chassis which will hereinafter be referred to as ground. A main switch 12 has two fixed contacts 13 and 14, one of which is connected to the battery positive terminal and the other of which is the positive supply terminal $+Ve$ to the electrical loads of the vehicle These loads and the usual generator are represented diagrammatically in FIG. 1 as an ignition circuit 15 and a block 16 for other loads and generator. These other loads represent the majority of the electrical facilities in the vehicle including such things as lamps, windscreen wipers, radio, clock, instruments, starter motor, electric motors for seat and mirror adjustments and so on.

Main switch 12 also incorporates a moving contact 17 which can be moved into engagement with contacts 13 and 14 to interconnect them or can be separated from contacts 13 and 14 to leave the switch in an open condition as shown. Moving contact 17 is spring loaded by spring 20 to the open condition and can be closed by energisation of a coil 18 acting on armature 19 so that the parts of the main switch thus far described constitute a relay. A manually operable mechanical actuator 21 is arranged to act on an end of armature 19 to provide further control for the main switch. When the mechanical actuator is depressed into the main switch in a direction towards the fixed contacts 13 and 14 the switch is closed regardless of the state of energisation of the coil 18. When the mechanical actuator 21 is retracted as shown, the moving contact 17 is biased into an open condition by spring 20 but can be closed by energisation of coil 18.

One terminal of coil 18 is connected by lead 22 to the terminal associated with contact 13. The second lead from the coil is connected to one side of a vehicle ignition switch 23 representing an engine function element. The other side of the ignition switch 23 is connected to ground. The lead from the coil 18 to switch 23 incorporates a plug and socket connector 24 so that this connection can be broken.

A blocking diode 25 is provided between the ignition circuit and the switch 23 to prevent undesired reverse current flow under conditions which will be described subsequently.

Starting from the condition shown, with the switch 12 open, none of the electrical loads of the vehicle are operable because of the absence of a connection to the battery positive terminal. The blocking diode 25 serves to prevent current from the battery passing through coil 18, through the ignition circuit in a reverse direction and then through any other loads in the normal direction. Diode 25 is such as to allow no significant leakage current. This leaves the vehicle in a condition suitable for transportation and storage with little risk of significant current drain from the battery even over a period of several weeks.

If it is desired to move the vehicle under its own power or to check the function of a particular electrical component or otherwise to utilise power from the battery, the ignition switch 23 is closed. Typically this a the normal key operated vehicle ignition switch. Current then flows from the battery positive terminal through coil 18 and switch 23 to ground. The coil is thus energised, closing main switch 12 and providing a supply of current through the main switch to the ignition circuit and to other loads. The vehicle may then be operated normally with all facilities usable. On switching off the ignition, coil 18 is de-energised and the main switch is again opened to isolate the battery once more.

The arrangement just described is unsuitable for regular vehicle use because the disconnection of all loads includes various memories and the vehicle clock which should preferably be maintained in operation when a vehicle is left unattended. Immediately prior to delivery of the vehicle to an end user the switch 12 is closed by mechanical actuator 21. This switch closure is intended to be almost permanent so that when the vehicle is left unattended with the ignition switch off those loads which require continuous connection to the vehicle battery are maintained in operation The connector 24 is also disconnected prior to delivery of the vehicle to its end user, thus rendering the coil 18 inoperative. The terminals of connector 24 should be rendered safe, possibly by connecting both to a dummy terminal block through which there is no electrical connection. This arrangement has the advantage of avoiding loose terminals which could inadvertently be shorted to ground or which might be reconnected by a well intentioned vehicle user.

If the vehicle is to be left unused for a period of time or under conditions such that avoiding inadvertent battery drain or providing additional security can be more important than maintaining power to some facilities, the user has the opportunity to open the switch 12 through the mechanical actuator 21. This arrangement provides security which is additional to normal security in that after the disconnection of connector 24 operation of ignition switch 23 can not close the main switch 12 to provide power to the vehicle loads including the ignition. The battery 11, the switch 12 and the connector 24 should all be positioned in a secure area of the car, for example within the car boot. This is because an intruder with access to the battery positive terminal or the switch 12 or connector 24 would be able to override the switch 12, for example by running an extra wire from the battery positive terminal to the positive side of any vehicle load. Resistance to inadvertent battery discharge corresponds to that provided on manufacture of the vehicle. If the actuator 21 is or incorporates a removable element in the nature of a key, an even more secure arrangement results. Details of the switch 12 will now be described with reference to FIGS. 2 and 3. The device shown is in effect a standard heavy duty relay with the addition of a manual actuator. The relay comprises a contact housing 31 to which the coil 18 is mounted by a U-shaped steel strap 32. A housing 33 of the mechanical actuator 21 is in turn mounted on the strap 32.

Fixed contacts 13 and 14 are mounted in the housing 31 in the usual way. Movable contact 17 intended to bridge between fixed contacts 13 and 14 is mounted on one end of the relay armature 19. Movable contact 17 floats on the end of armature 19 by virtue of spring 34 to control the contact closure pressure in the usual way. Similarly a conventional push off spring 20 provides for positive opening of the contacts when the coil is de-energised. The electrical connections to the coil are connected as described previously. As thus far described the switch 12 is a conventional heavy duty relay.

The mechanical actuator comprises a longitudinally movable plunger 36 which incorporates a nose 37 for direct engagement on an end of the armature 19. The plunger also has an elongated flange 38 with end grooves 39 for engagement by two wire-loop over-centre springs 41 mounted within the actuator housing 33. The over-centre springs are arranged to hold the plunger positively in a retracted position as shown in full or in the extended position illustrated in ghost. In the retracted position, the plunger has no effect on the action of the relay which thus simply operates in dependence on the state of energisation of coil 18. When the plunger is in the extended position, its nose 37 bears against the free end of armature 19 and causes it to close the movable contact 17 against fixed contact 13 and 14, thus closing the switch. The strength of the over-centre spring in relation to the relay springs 34 and 20 and the permissible movement of the armature 19 are such that when the switch is closed mechanically by plunger 36 the contact pressure is determined by spring 34 as in normal use of the relay. On retraction of the plunger 36, the contacts are opened in the usual way for a relay by the effect of spring 20.

It is desirable for the plunger 36 to be removable for security purposes and also for the plunger to be lockable very securely in its switch closed ie extended position to ensure that there is no serious risk of the switch opening inadvertently and thus causing a complete electrical failure in the vehicle. For these purposes the plunger passes through a non-circular elongated aperture 35 in the casing 33 and has a series of correspondingly shaped flanges which will pass through the aperture in one direction of rotational orientation but will not pass through the aperture in other orientations. In detail, the plunger has a first elongated flange 38 and a second elongated flange 42 set behind flange 38. One circular narrow neck 43 is arranged between the flanges 38 and 42 and allows rotation of the plunger in the elongated aperture 35 when the neck is aligned with the aperture. A second neck 44 behind the flange 42 also allows corresponding angular rotation when it in turn is in alignment with the aperture 35.

Figure 3:
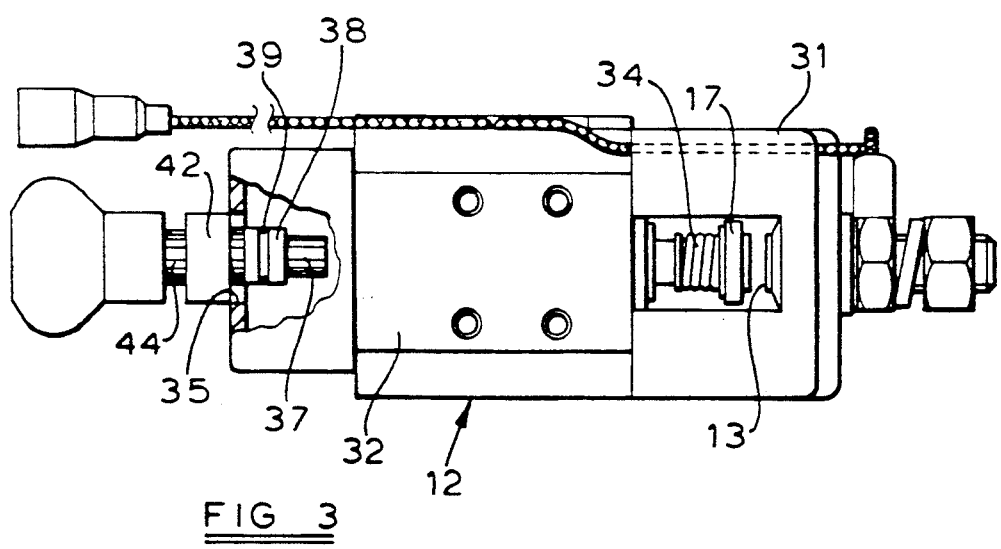
FIG. 3 is a view in the direction of III of FIG. 2.

In use, the plunger is inserted into the aperture 35 by having flange 38 in alignment with aperture 35. This insertion is limited by flange 42 coming into engagement with the end face of casing 33. In this position, grooves 39 in flange 38 are in alignment with springs 41 but the narrow dimension of the flange as shown in FIG. 3 is such that it does not engage with the springs. The plunger is then rotated about its own axis through 90 degrees. The grooves 39 in the ends of flange 38 then engage positively with the springs 41. The plunger can not now be retracted because flange 38 is no longer in alignment with aperture 35. However, flange 42 is in alignment with this aperture, allowing the plunger to be moved further in to the switch. Initial further inward movement compresses the over-centre springs and thus meets with resistance but once the centre position is reached the springs snap the plunger to its fully inserted position. It is this further inward movement that causes the switch contacts to be closed by thrust from nose 37 on armature 19. Because neck 44 is now engaged in aperture 35, rotation of the plunger is again possible and it should be rotated through a further 90 degrees. This brings flange 42 out of alignment with the aperture 35 and thus the plunger can not in this situation be retracted or removed. On closure of the switch, the plunger 36 is initially held in the closed or extended position by the over-centre springs 41. After the 90 degree rotation referred to above, it is held by engagement of flange 42 against the inner face of housing 33 surrounding aperture 35.

The peripheral shape of the groove 39 and the shape of springs 41 are such as to resist rotation of the plunger from either of the rotational positions described. Thus spring resistance is required to overcome any of the 90 degree rotational movements described, avoiding any tendency for inadvertent rotation and thus inadvertent locking or unlocking of the plunger.

Figure 2:
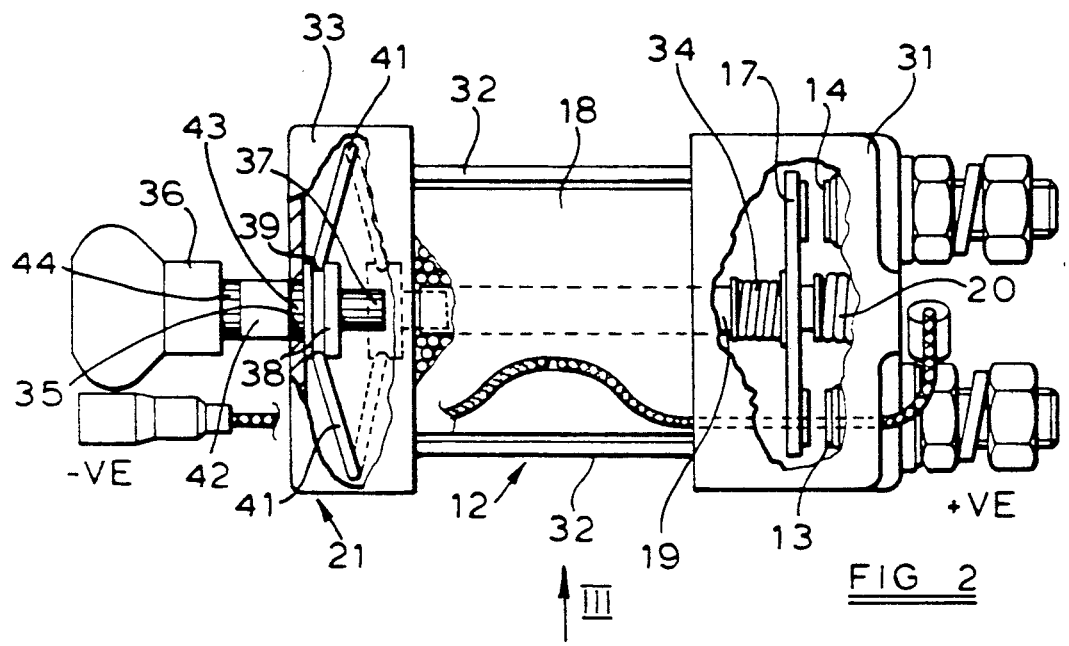
FIG. 2 is a partially cut away side elevation of the main switch.

Summarising use of the whole installation, the car is built with the electrical connections as shown in FIG. 1 and with the plunger in the position shown in full in FIG. 2. The main switch 12 acts as a relay under the control of the vehicle ignition switch. Power to normal loads of the vehicle is thus cut off when the ignition is switched off. Immediately prior to delivery of the vehicle to a customer, connection 24 is broken so that the relay coil can no longer be energised. Plunger 36 is pushed into the switch closed position and rotated through 90 degrees to lock it in position The vehicle thus behaves normally with electrical power available continuously to all facilities.

If the vehicle is to be unattended for a long period of time and the user is concerned about battery drain, the plunger may be rotated through 90 degrees and withdrawn as far as the off position shown in full in FIG. 2. Both the ignition and the other electrical loads are now isolated from the battery. If the vehicle user is also concerned about security, the plunger may be rotated through a further 90 degrees and withdrawn entirely. The vehicle user may carry the plunger with him or hide it in an inaccessible position within the car.

When the switch, battery and connection 24 are all within the trunk or boot of the car (or in another inaccessible lockable compartment) as represented in FIG. 1 by compartment 10, a good degree of security is provided even if the plunger is not removed. The location of connection 24 is important because access to it could enable an intruder to activate the relay and thus restore electrical power. Although the switch 23 has been referred to as an ignition switch, it could control some other primary engine function. For example, in a diesel engined car with no ignition, the switch may control other vital engine functions without which the engine can not start or run.

The selectively active engine function element need not necessarily be the ignition switch or the equivalent switch in a compression ignition engine. It is also possible in some cars to utilise an engine function element which signals whether the engine is actually running and not just whether the ignition or equivalent switch is on. For example, some cars have a relay controlled fuel pump arranged to be energised when the engine is running and also energised for sufficient time to start the engine when the ignition or equivalent is turned on. A timer de-energises the relay and cuts out the fuel pump if the vehicle is left with the ignition or equivalent on but the engine not running. For a spark ignition engine, the signal which drives the relay via the timer is derived from a train of ignition timing pulses indicative of engine rotation.

The fuel pump relay or the device which drives this relay may be used as the engine function element. Such an arrangement thus responds to a vehicle being left with ignition on but engine not running to open the main switch and cut the power supply. A re-set function responsive to turning off the ignition switch should also be provided so that electrical power can be restored to the engine and other vehicle functions when required.

In a typical installation, the electrical supply to all of the electrical facilities of the vehicle is effected through the main switch. However, it is possible that there may be some vehicle electrical facilities for which maintenance in an active condition is more important than the risk of battery drain through them. Facilities of this nature may include a security alarm system which may be connected direct to the battery instead of being connected to the battery through main switch 12. There are very few exceptions for which this direct connection would be required and in all cases substantially all of the electrical facilities are connected to the battery through the main switch 12.

I claim

1. An electrical supply control system from a battery to substantially all of the electrical facilities of a motor vehicle comprising a main switch, connections from the battery to the main switch and from the main switch to the electrical facilities arranged to supply power from the battery to the electrical facilities, a coil arranged when energised to close the main switch, a selectively active engine function element operatively connected to the coil and battery to energise the coil when the element is active, means for disconnecting the coil from the engine function element, and a manually operable mechanical actuator for the main switch arranged in one position to close the main switch and in another position to allow the state of energisation of the coil to control opening and closing of the main switch.

2. An electrical supply control system according to claim 1 wherein the engine function element is a switch.

3. An electrical supply control system according to claim 1 wherein the engine function element is an ignition switch.

4. An electrical supply control system according to claim 1 wherein the mechanical actuator includes a removable element which when removed leaves the switch open if the coil is not energised.

5. An electrical supply control system according to claim 1 further comprising a blocking diode arranged to prevent current flowing through the coil and then in a reverse direction through the circuits controlled by the engine function element.

6. An electrical supply control system according to claim 1 wherein the vehicle battery, the main switch and the means for disconnecting the coil from the engine function element are all disposed in a lockable compartment of the vehicle.

* * * * *